United States Patent
Hong

(10) Patent No.: US 9,159,179 B2
(45) Date of Patent: Oct. 13, 2015

(54) COMMON ACCESS CARD SECURITY AND DOCUMENT SECURITY ENHANCEMENT

(75) Inventor: Jiang Hong, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 1658 days.

(21) Appl. No.: 11/809,834

(22) Filed: May 31, 2007

(65) Prior Publication Data

US 2008/0301792 A1  Dec. 4, 2008

(51) Int. Cl.
 G06F 21/34 (2013.01)
 G07C 9/00 (2006.01)
 H04L 9/00 (2006.01)
 H04L 9/32 (2006.01)

(52) U.S. Cl.
 CPC ............ *G07C 9/00039* (2013.01); *H04L 9/006* (2013.01); *H04L 9/3263* (2013.01); *H04L 2209/608* (2013.01)

(58) Field of Classification Search
 CPC ...... G06F 21/34; H04L 63/0853; B41M 3/10; B41M 3/146; G06T 2201/005; G06T 2201/0064
 USPC ...................................... 726/9; 713/155–159
 See application file for complete search history.

(56) References Cited

U.S. PATENT DOCUMENTS

| | | | |
|---|---|---|---|
| 6,000,728 A * | 12/1999 | Mowry, Jr. ....................... 283/93 |
| 6,526,512 B1 * | 2/2003 | Siefert et al. ..................... 726/21 |
| 6,704,119 B1 * | 3/2004 | Suzuki et al. ................ 358/1.16 |
| 7,562,223 B2 * | 7/2009 | Ragnet et al. .................. 713/171 |
| 7,975,144 B2 * | 7/2011 | Adams et al. .................. 713/176 |
| 8,281,120 B2 * | 10/2012 | Tsao ............................... 713/150 |
| 2003/0147549 A1 * | 8/2003 | Choi et al. ...................... 382/100 |
| 2005/0144463 A1 * | 6/2005 | Rossebo et al. ................ 713/185 |
| 2006/0072144 A1 * | 4/2006 | Dowling et al. .............. 358/1.15 |
| 2006/0126100 A1 * | 6/2006 | Jung ............................. 358/1.14 |
| 2006/0268331 A1 * | 11/2006 | Fukunishi ..................... 358/1.15 |
| 2007/0086061 A1 * | 4/2007 | Robbins ......................... 358/400 |
| 2008/0008318 A1 * | 1/2008 | Kinoshita ..................... 380/217 |

FOREIGN PATENT DOCUMENTS

| JP | 2003-134327 | | 5/2003 |
|---|---|---|---|
| JP | 2005159726 A | | 6/2005 |
| JP | 2005265902 A | * | 9/2005 |
| JP | 2006-229670 | | 8/2006 |
| JP | 2006-236312 | | 9/2006 |
| JP | 2006-319603 | | 11/2006 |

\* cited by examiner

*Primary Examiner* — Taghi Arani
*Assistant Examiner* — Phy Anh Vu
(74) *Attorney, Agent, or Firm* — Hickman Palermo Becker Bingham LLP; Edward A. Becker

(57) ABSTRACT

Techniques and systems for maintaining a secure document replication environment based on information contained in CACs are disclosed. In one embodiment of the invention, a device such as an MFP, a printer, a scanner, a copier, or a fax machine comprises or is connected to a card reader. The device prevents users from using the device until the users have been authenticated. In order to authenticate himself to the device, a user inserts his CAC into the card reader. The device reads the user's digital certificate off of the user's CAC. The device determines whether the digital certificate is valid. If the digital certificate is not valid, then, in one embodiment of the invention, the device prevents the user from using any of the device's functions (e.g., printing, scanning, copying, faxing, etc.).

18 Claims, 3 Drawing Sheets

COMMON ACCESS CARD SECURITY AND DOCUMENT SECURITY ENHANCEMENT

FIELD OF THE INVENTION

The invention relates to security, and more specifically, to systems and techniques for maintaining a secure document replication environment based on information contained on Common Access Cards.

BACKGROUND

Smart Cards are cards that conform to the International Organization for Standardization ("ISO") 7816 standard, which is incorporated by reference herein. Smart Cards typically resemble credit cards in shape and material composition, but typically also contain integrated circuitry—usually in the form of a microchip underneath a gold-colored electrical contact patch. The integrated circuitry typically includes non-volatile memory on which data (e.g., data pertaining to the card bearer) can be stored.

A Common Access Card ("CAC") is a specific kind of Smart Card that is used by the personnel of the United States Department of Defense ("DOD"). The CAC is issued as standard identification for active duty military personnel, reserve personnel, civilian employees, and eligible contractor personnel. In addition to being used as a general identification card, the CAC is used for authentication to enable authorized personnel to access DOD computers, DOD networks, and certain DOD facilities. The CAC enables the encryption of e-mail messages, facilitates the use of public key infrastructure ("PKI") authentication tools, and establishes an authoritative process for the use of identity credentials.

A multi-function peripheral ("MFP") is a machine which incorporates the functionality of multiple devices in one, so as to have a smaller "footprint" in a home or business setting, and so as to provide centralized document management, distribution, and production. A typical MFP acts as a combination of some or all of the following devices: printer, scanner, photocopier, fax machine, and telephone. The Ricoh Aficio Color 5560 is an example of an MFP. The Ricoh Aficio Color 5560 provides copying functionality, printing functionality, scanning functionality, and document-serving functionality all in one unit.

It is expected that the DOD will soon require all MFPs that the DOD purchases and uses to contain security mechanisms that will prevent the use of those MFPs except by users who have authenticated themselves to those MFPs via a CAC.

SUMMARY

Techniques and systems for maintaining a secure document replication environment based on information contained on CACs are disclosed. In one embodiment of the invention, a device such as an MFP, a printer, a scanner, a copier, or a fax machine includes or is connected to a card reader. The device prevents users from using the device until the users have been authenticated. In order to authenticate himself to the device, a user inserts his CAC into the card reader. The device reads the user's digital certificate off of the user's CAC. The device determines whether the digital certificate is valid. If the digital certificate is not valid, then, in one embodiment of the invention, the device prevents the user from using any of the device's functions (e.g., printing, scanning, copying, faxing, etc.).

In one embodiment of the invention, if the digital certificate is valid, then the device reads, from the user's CAC, characteristics about the user. Such characteristics may include characteristics that can be possessed by multiple different users, such as rank or access level, for example. The device consults stored mapping information that maps various different characteristics (or sets of characteristics) to various different sets of privileges. Each set of privileges may indicate a set of the device's functions that may be used by users who have the characteristic (or set of characteristics) that is mapped to that set of privileges. In one embodiment of the invention, the device presents the user from using any of the device's functions that correspond to privileges that are not in a set of privileges that is mapped to the user's characteristic (or set of characteristics).

In one embodiment of the invention, whenever a device prints, copies, scans, or faxes a document, the device adds, to the physical copy or scanned image of the document, information that identifies the user who caused the device to generate the physical copy or scanned image. The device reads this information from the user's CAC. For example, in one embodiment of the invention, the information is added to the copy or image in the form of a watermark that conspicuously and visibly shows the user's name or unique identity code (among possibly other information) in the "background" of the document. In another embodiment of the invention, the information is added to the copy or image in the form of a barcode that inconspicuously indicates, to a machine that is capable of reading the barcode, the user's name or unique identity code (among possibly other information).

Additionally or alternatively, in one embodiment of the invention, instead of or in addition to placing the user's name or unique identity code in a watermark that the device adds to the copy or image, the device places, in such a watermark, information that conspicuously and visibly indicates that the copy or image was generated by a user (whom the watermark might or might not identify) who was not authorized to create the copy or image, if that user was not authorized to do so. For example, the watermark might say, "UNAUTHORIZED COPY." In order to determine whether a user is authorized to generate a copy or image, the device may determine whether the set of privileges to which the user's CAC-defined characteristic (or set of characteristics) is mapped includes a privilege for the device function (e.g., copy, scan, print, fax, etc.) that is to be used to generate the copy or image.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
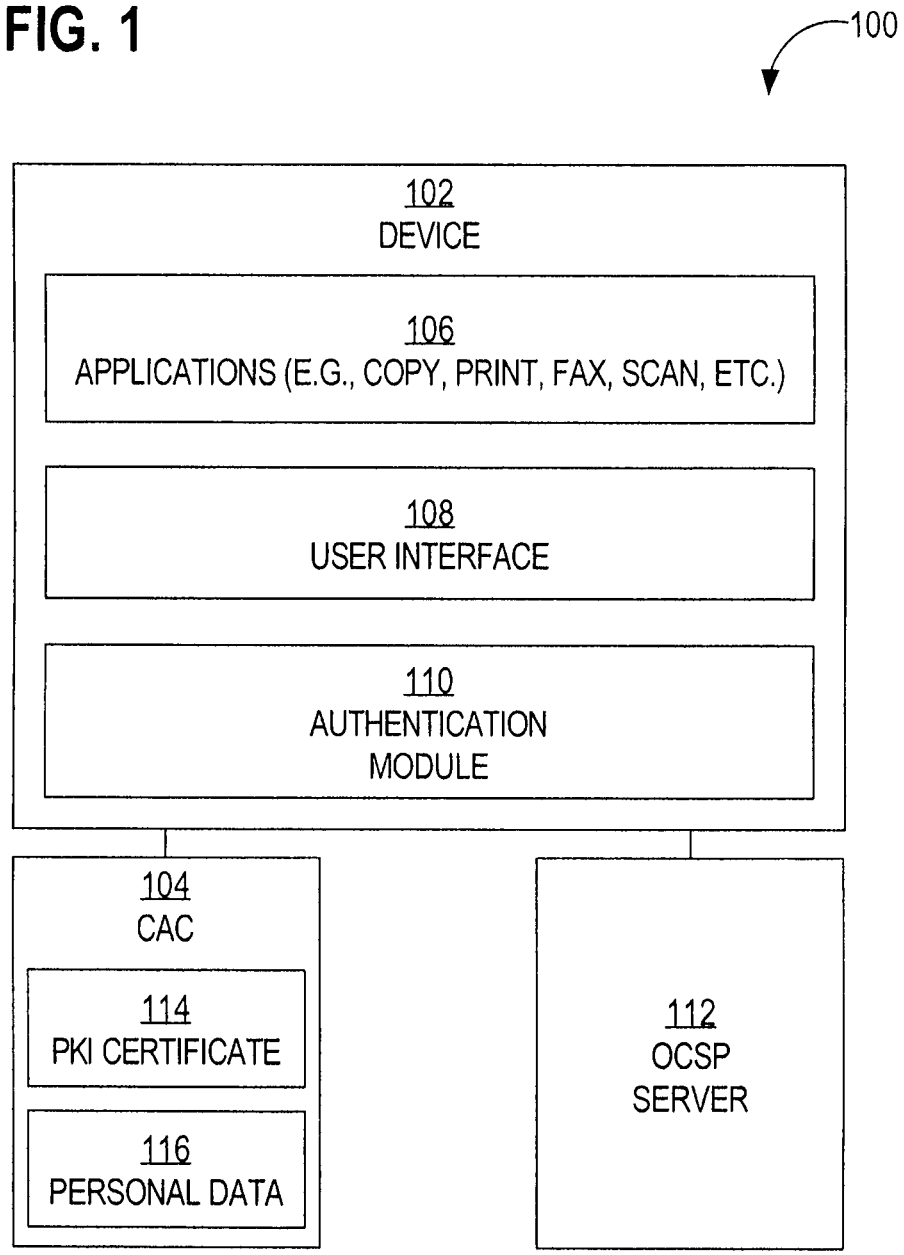
FIG. 1 is a block diagram that illustrates an example system in which a device controls access to that device's functionality by requiring prospective users of that device to authenticate themselves to the device using those users' CACs, according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Techniques and systems for maintaining a secure document replication environment based on information contained on CACs are disclosed. In one embodiment of the invention, a device such as an MFP, a printer, a scanner, a copier, or a fax machine includes or is connected to a card reader. The device prevents users from using the device until the users have been authenticated. In order to authenticate himself to the device, a user inserts his CAC into the card reader. The device reads the user's digital certificate off of the user's CAC. The device determines whether the digital certificate is valid. If the digital certificate is not valid, then, in one embodiment of the invention, the device prevents the user from using any of the device's functions (e.g., printing, scanning, copying, faxing, etc.).

In one embodiment of the invention, if the digital certificate is valid, then the device reads, from the user's CAC, characteristics about the user. Such characteristics may include characteristics that can be possessed by multiple different users, such as rank or access level, for example. The device consults stored mapping information that maps various different characteristics (or sets of characteristics) to various different sets of privileges. Each set of privileges may indicate a set of the device's functions that may be used by users who have the characteristic (or set of characteristics) that is mapped to that set of privileges. In one embodiment of the invention, the device presents the user from using any of the device's functions that correspond to privileges that are not in a set of privileges that is mapped to the user's characteristic (or set of characteristics).

In one embodiment of the invention, whenever a device prints, copies, scans, or faxes a document, the device adds, to the physical copy or scanned image of the document, information that identifies the user who caused the device to generate the physical copy or scanned image. The device reads this information from the user's CAC. For example, in one embodiment of the invention, the information is added to the copy or image in the form of a watermark that conspicuously and visibly shows the user's name or unique identity code (among possibly other information) in the "background" of the document. In another embodiment of the invention, the information is added to the copy or image in the form of a barcode that inconspicuously indicates, to a machine that is capable of reading the barcode, the user's name or unique identity code (among possibly other information).

Additionally or alternatively, in one embodiment of the invention, instead of or in addition to placing the user's name or unique identity code in a watermark that the device adds to the copy or image, the device places, in such a watermark, information that conspicuously and visibly indicates that the copy or image was generated by a user (whom the watermark might or might not identify) who was not authorized to create the copy or image, if that user was not authorized to do so. For example, the watermark might say, "UNAUTHORIZED COPY." In order to determine whether a user is authorized to generate a copy or image, the device may determine whether the set of privileges to which the user's CAC-defined characteristic (or set of characteristics) is mapped includes a privilege for the device function (e.g., copy, scan, print, fax, etc.) that is to be used to generate the copy or image.

Example CAC Security System

FIG. 1 is a block diagram that illustrates an example system in which a device controls access to that device's functionality by requiring prospective users of that device to authenticate themselves to the device using those users' CACs, according to an embodiment of the invention. System 100 includes a device 102 and a CAC 104. In one embodiment of the invention, device 102 is any device that is capable of generating a physical copy or scanned image of a document. For example, device 102 may be an MFP, a printer, a photocopier, a scanner, or a fax machine. CAC 104 is a Smart Card that stores information about a particular user who bears CAC 104. Alternative embodiments of the invention may include more, fewer, or different components than those illustrated in this example.

In one embodiment of the invention, device 102 includes one or more applications 106, such as copy applications, print applications, fax applications, scan applications, etc. Each such application (or module) may include hardware, software, or a combination of hardware and software. In one embodiment of the invention, device 102 includes a user interface 108. User interface 108 may be built-in to device 102. User interface 108 may include a display from which users of device 102 can read digitally presented information that device 102 outputs. User interface 108 may also include a keypad with one or more buttons that users of device 102 can use to input information and commands into device 102.

In one embodiment of the invention, device 102 includes an authentication module 110. Authentication module 110 may be a program that reads data from and/or writes data to CAC 104. More specifically, in one embodiment of the invention, authentication module 110 (a) reads a PKI certificate 114 that is stored on CAC, (b) determines whether PKI certificate 114 is a valid certificate and (c) communicates (e.g., via a network such as a LAN, WAN, or the Internet) with a remote online certificate status protocol ("OCSP") server 112 to determine whether PKI certificate 114 has expired. In one embodiment of the invention, device 102 reads the data that is stored on CAC 104 using a card-reading interface that is built in to user interface 108; a user may swipe CAC 104 through such a card-reading interface, for example. In another embodiment of the invention, device 102 reads the data that is stored on CAC 104 using a card-reading device that is separate from, but connected to, device 102; a user may insert CAC 104 into such a card-reading device, for example.

In one embodiment of the invention, CAC 104 stores both PKI certificate 114 and personal data 116. Generally, personal data 116 is information about the user who bears CAC 104. For example, in one embodiment of the invention, personal data 116 includes data such as the bearer's name, the bearer's military rank, and the bearer's serial number. In one embodiment of the invention, personal data 116 includes a security level designation that has been assigned to the bearer of CAC 104. In one embodiment of the invention, personal data 116 includes a personal identification number (PIN); the bearer of CAC 104 might select this PIN in some embodiments of the invention. Personal data 116 may additionally include other information about the bearer of CAC 104, such as information about the bearer's benefits, restrictions, etc.

An example technique that uses components of system 100, according to one embodiment of the invention, is described in further detail below.

Authenticating a User Using the User's CAC

Figure 2:
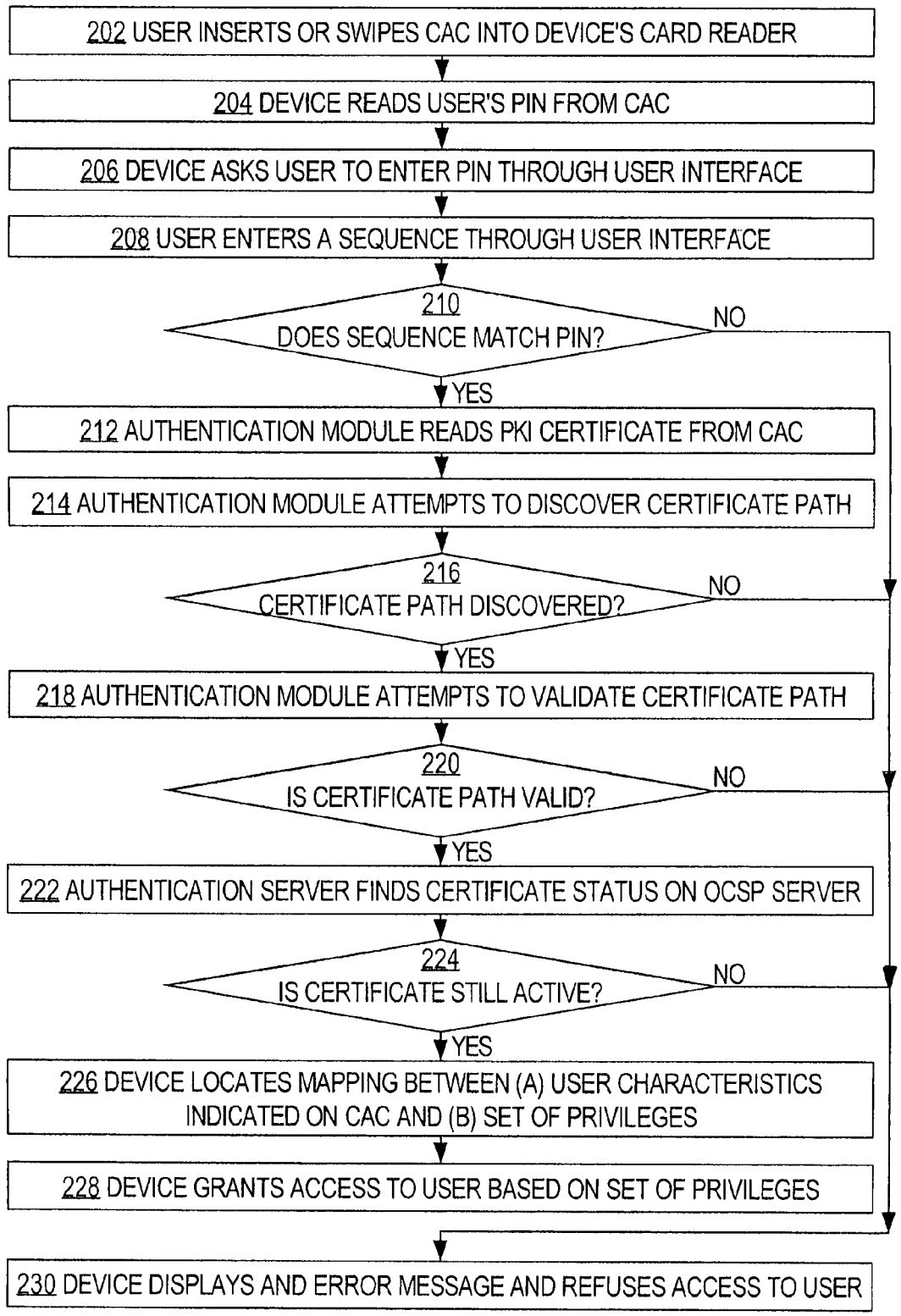
FIG. 2 is a flow diagram that illustrates an example technique by which a device authenticates a user using the user's CAC, according to an embodiment of the invention.

FIG. 2 is a flow diagram that illustrates an example technique by which a device authenticates a user using the user's CAC, according to an embodiment of the invention. Alternative embodiments may involve more, fewer, or different steps than those illustrated in FIG. 2. In one embodiment of the invention, device 102 does not allow any user to use any of applications 106 until the user has authenticated himself to device 102 according to the technique described below.

In block 202, a user inserts or swipes CAC 104 into a card reader of device 102. In block 204, device 102 reads the user's PIN from CAC 104. In block 206, device 102 asks the user to enter the PIN through user interface 108. In block 208, the user enters a sequence through user interface 108. In block 210, device 102 determines whether the sequence that was entered through user interface 108 matches the PIN that device 102 read from CAC 104. If the sequence matches the PIN, then control passes to block 212. Otherwise, control passes to block 230.

In block 212, authentication module 110 reads PKI certificate 114 from CAC 104. In block 214, authentication module 110 attempts to discover the "certificate path" for PKI certificate 114. An example technique for attempting to discover this certificate path is described in greater detail in the section titled "DISCOVERING THE CERTIFICATE PATH" below. In block 216, authentication module 110 determines whether a certificate path was successfully discovered for PKI certificate 114. If a certificate path was successfully discovered for PKI certificate 114, then control passes to block 218. Otherwise, control passes to block 230.

In block 218, authentication module 110 attempts to validate the certificate path that authentication module 110 discovered in block 214. An example technique for attempting to validate this certificate path is described in greater detail in the section titled "VALIDATING THE CERTIFICATE PATH" below. In block 220, authentication module 110 determines whether the certificate path was successfully validated. If the certificate path was successfully validated, then control passes to block 222. Otherwise, control passes to block 230.

In block 222, authentication server 110 checks the status of PKI certificate 114 on OCSP server 112. For example, authentication server 110 may send a request, via a network, to OCSP server 112. The request may identify PKI certificate 114. OCSP server 112 may respond to such a request, via the network, with a response that indicates whether PKI certificate 114 has expired, has been revoked, or is still active. OCSP server 112 may be maintained by an authoritative entity; for example, in the military context, OCSP server 112 may be maintained by the DOD. In block 224, authentication module 110 determines whether PKI certificate is still active (i.e., has not expired and has not been revoked). If PKI certificate is still active, then control passes to block 226. Otherwise, control passes to block 230.

In block 226, using one or more user characteristics indicated in personal data 116, device 102 locates a mapping between those characteristics and a set of privileges. For example, device 102 may locate a mapping, stored in the memory of device 102, between (a) a military rank that is indicated in personal information 116 and (b) a set of privileges to which that military rank is mapped; one military rank might be mapped to one set of privileges, while another military rank might be mapped to another, different set of privileges. For another example, device 102 may locate a mapping, stored in the memory of device 102, between (a) a security access level that is indicated in personal information 116 and (b) a set of privileges to which that security access level is mapped; one security access level might be mapped to one set of privileges, while another security access level might be mapped to another, different set of privileges. In one embodiment of the invention, because such mappings are established between characteristics that multiple users share (e.g., military rank, security access level, etc.) and sets of privileges that all users having those characteristics share, there is no need to establish a separate mapping between each individual user and that user's set of privileges. As a result, the mappings are reduced in number and are more easily maintained by administrators of device 102. Beneficially, the mappings may make use of characteristics (e.g., military rank) that will already be on each CAC for various other purposes.

In block 228, device 102 grants access to the user based on the set of privileges indicated in the mapping located in block 226. Different sets of privileges may enable different users to perform different operations relative to device 102. For example, a set of privileges may indicate whether a user that is associated with that set can (a) print, (b) scan, (c) copy, and/or (d) fax using device 102. Some users' characteristics might be associated with sets of privileges that permit those users to perform all of these operations, while other users' characteristics might be associated with sets of privileges that allow those users to perform some, or even none, of these operations. In one embodiment of the invention, if a user attempts to command device 102 to perform an operation that is not within the set of privileges to which that user's characteristics are mapped, then device 102 indicates, via user interface 108, that the user is not allowed to perform that operation. Under such circumstances, device 102 refuses to perform that operation.

In one embodiment of the invention, different devices may map different sets of privileges to the same set of characteristics. Thus, in one embodiment of the invention, one device might allow all users of a certain military rank to use all of the functions of that device, while another device might prevent all users of that same military rank from using any of the functions of that other device.

Alternatively, in block 230, device 102 displays an error message through a display of user interface 108. The error message may indicate, to the user, the reason why the user could not be authenticated (e.g., wrong PIN, expired certificate, revoked certificate, invalid certificate, etc.). Under such circumstances, device 102 prevents the user from accessing or using any of the functionality that is provided by any of applications 106.

As a result of the technique described above, device 102 is protected from use and access by unauthorized users. Users who do not have a CAC and a matching PIN are unable to use device 102 in any meaningful way. Beneficially, using CACs instead of usernames and passwords that are manually typed into a device's user interface prevents unauthorized onlookers and snoopers from discovering, via nefarious means, the usernames and passwords of other, authorized users. Thus, CACs provide a highly secure mechanism for preventing unauthorized access and use of device 102.

Discovering the Certificate Path

As is discussed above with reference to block 214 of FIG. 2, in one embodiment of the invention, authentication module 110 attempts to discover a certificate path for PKI certificate 114. The purpose of discovering the certificate path is to ensure that PKI certificate 114 was issued by a legitimate, rather than a bogus, source.

Typically, the authority to issue any certificate ultimate derives from a trusted certificate authority called the "root" certificate authority. In the military context, the root certificate authority may be the DOD headquarters, for example. The root certificate authority has its own PKI certificate. The root certificate authority's PKI certificate is self-signed.

The root certificate authority may issue other PKI certificates to other certificate authorities that are called "sub" certificate authorities. Thus, each sub certificate authority may have its own PKI certificate that was issued from the root certificate authority. Each of these sub certificate authorities may, in turn, issue PKI certificates to yet other sub certificate authorities. Additionally, sub certificate authorities may issue PKI certificates to end users. Such end-user PKI certificates may be stored on CAC cards, for example. Except for the root certificate authority's PKI certificate, each PKI certificate indicates the identity of the certificate authority that issued that PKI certificate.

In one embodiment of the invention, the PKI certificates of all known legitimate certificate authorities are stored on device 102. In one embodiment of the invention, if the PKI certificate of a supposed certificate authority cannot be found on device 102, then that supposed certificate authority is assumed to be bogus and illegitimate.

In one embodiment of the invention, in order to discover the certificate path of PKI certificate 114, the identity of the certificate authority that issued PKI certificate 114 is determined from PKI certificate 114. Then, the PKI certificate of that certificate authority is examined. If the PKI certificate of that certificate authority is the root certificate authority's PKI certificate, then the inquiry ends, and the certificate path has been discovered. Otherwise, the identity of the certificate authority that issued that PKI certificate is determined from that PKI certificate, and that certificate authority's PKI certificate is examined in like manner. This process continues recursively until the root certificate authority's PKI certificate is discovered, or until no legitimate issuer for a given PKI certificate can be found on device 102.

Validating the Certificate Path

As is discussed above with reference to block 218 of FIG. 2, in one embodiment of the invention, authentication module 110 attempts to validate a discovered certificate path for PKI certificate 114. In one embodiment of the invention, after a certificate path has been discovered using the technique described above, the validity of each of the signatures in each PKI certificate in the certificate path is determined. If all of the signatures of all of the PKI certificates in the certificate path are valid, then the certificate path is deemed to be valid. Alternatively, if any signature of any PKI certificate in the certificate path is invalid, then the certificate path is deemed to be invalid.

Typically, a valid PKI certificate's signature is an encrypted hash value that is produced by hashing the entire PKI certificate using a specified hash function and then encrypting that hash value using the private encryption key of the certificate authority that owns that PKI certificate. In one embodiment of the invention, in order to determine whether a particular certificate authority's PKI certificate's signature is valid, the particular certificate authority's public encryption key is used in an attempt to decrypt the signature. If the signature can be decrypted successfully using the particular certificate authority's public encryption key, and if the decrypted signature is the same hash value that is produced by hashing the PKI certificate using the specified hash function, then the signature is deemed to be valid. Otherwise, the signature is deemed to be invalid. In this manner, the validity of each signature of each PKI certificate in the certificate path may be determined.

Adding Watermarks to Identify Details about Replication

In one embodiment of the invention, whenever device 102 generates a printed copy of a document (e.g., by printing a physical copy of a document from data or by photocopying a physical copy of a document), device 102 adds a conspicuous, visible watermark in the background of that printed copy. Similarly, in one embodiment of the invention, whenever device 102 generates a digital image (e.g., GIF, JPEG, PDF, etc.) of a document (e.g., by scanning or faxing a physical copy of a document), device 102 adds a conspicuous, visible watermark in the background of that digital image. In one embodiment of the invention, the watermarks discussed above have the attributes described below.

In one embodiment of the invention, such a watermark visibly expresses one or more items of data that are contained in personal data 116, as read by device 102 from CAC 104. People can observe these items of data in the watermark in order to determine which user caused the physical copy or digital image containing that watermark to be generated. For example, the items of data may include (a) the name of the user, (b) the military rank of the user, (c) the serial number of the user, and/or (d) the security access level of the user, among other possible items of information. The presentation of such information in the watermark dissuades users from replicating documents without authorization. Thus, a secure document replication environment is established.

Additionally, in one embodiment of the invention, such a watermark indicates (a) the time at which the physical copy or digital image was generated, (b) the date on which the physical copy or digital image was generated, and/or (c) the identity of the device that generated the physical copy or digital image. Such information does not need to be read from CAC 104. Such information may help people to determine when and/or where a security breach occurred.

Additionally or alternatively, in one embodiment of the invention, such a watermark indicates whether the generation of the physical copy or digital image was caused by a user who had adequate privileges to cause such a physical copy or digital image to be generated. For example, in one embodiment of the invention, if a user commands device 102 to generate a copy of a document, and if the set of privileges to which that user's characteristics are mapped does not indicate that the user has the authority to generate copies in the manner being used, then device 102 adds, when generating the copy, a watermark that simply says "UNAUTHORIZED COPY." In one embodiment of the invention, such a watermark does not also identify the user or any of the user's characteristics.

Adding Barcodes to Identify Details about Replication

As is discussed above, in one embodiment of the invention, device 102 adds, to certain physical copies and digital images generated by device 102, a watermark that visibly and conspicuously expresses information about the circumstances and details underlying the generation of those physical copies and digital images. Although such information can be very useful, some people find highly visible watermarks to be distracting from the main content of the documents that bear such watermarks.

Therefore, in one embodiment of the invention, instead of (or in addition to) adding such a watermark to physical copies and digital images that device 102 generates, device 102 generates and adds, to such physical copies and digital images, a less conspicuous, machine-readable barcode. The barcode may encode information (readable by a machine) that indicates information of the kind that might otherwise be expressed in a watermark, as described above. Additionally, because barcodes may occupy much less space than a watermark, and yet encode much more information than a watermark could in a plainly readable font size, barcodes may indicate a larger quantity of information than the watermarks discussed above. In one embodiment of the invention, such a barcode may encode any or all of the information contained in personal data 116 on CAC 104. Additionally, such a barcode may encode details such as (a) the time at which the physical copy or digital image was generated, (b) the date on which the physical copy or digital image was generated, and/or (c) the identity of the device that generated the physical copy or digital image. In one embodiment of the invention, device 102 adds a barcode as described above to an edge of a physical copy or a digital image that device 102 generates based on a document.

Such barcodes beneficially enable people to determine the details pertaining to the generation of physical copies and digital images without interfering with the main content of the physical copies and digital images.

Implementation Mechanisms

Figure 3:
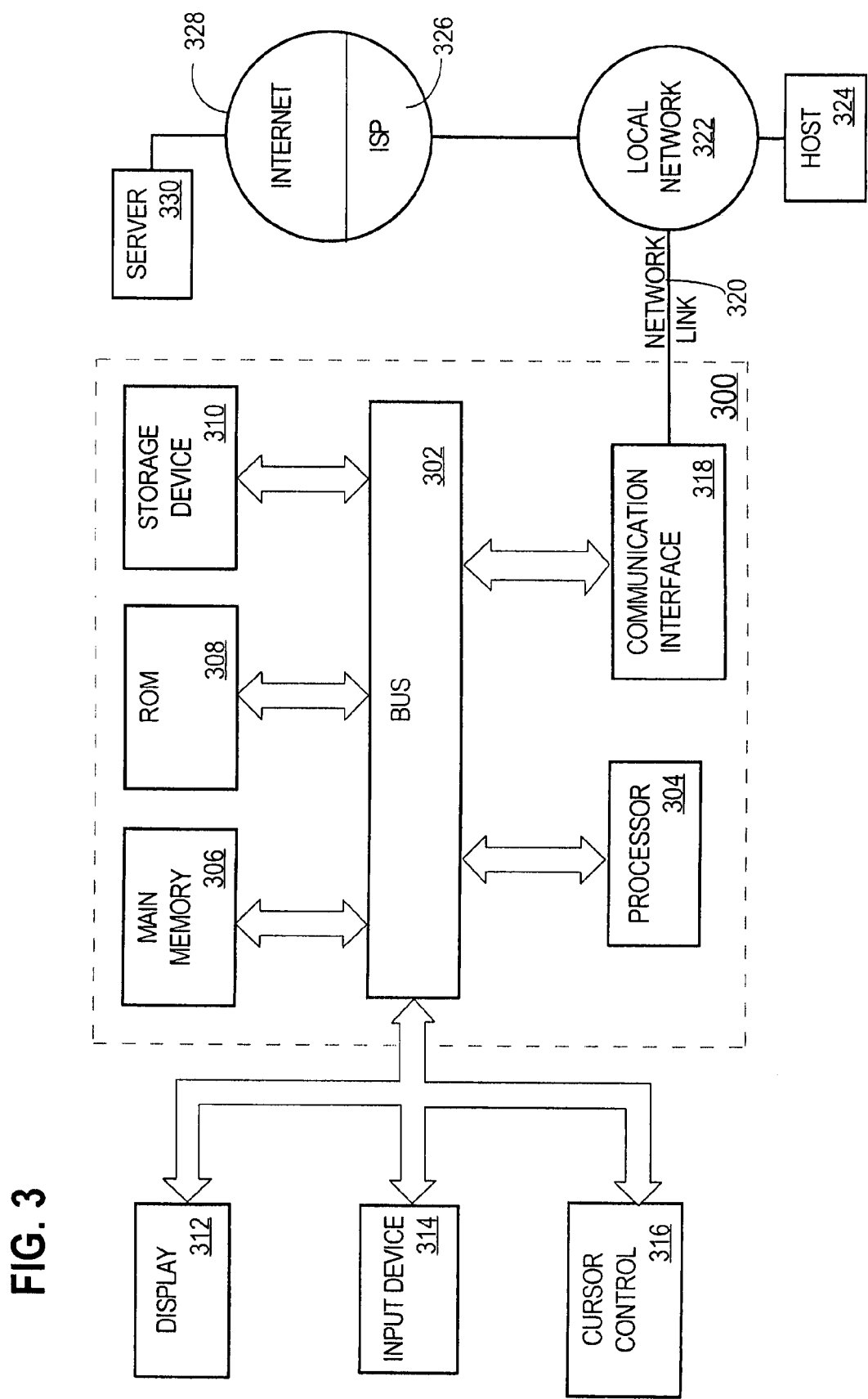
FIG. 3 is a block diagram that depicts a device upon which an embodiment of the invention may be implemented.

The approach described herein may be implemented on any type of computing platform or architecture. FIG. 3 is a block diagram that depicts an example computer system 300 upon which embodiments of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 300, various computer-readable media are involved, for example, in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A multi-function peripheral device comprising:
 a processor; and
 a memory, the memory stores machine readable instructions, which when processed by the processor cause:
  read, from a card, a) a public key infrastructure (PKI) certificate, and b) information that indicates one or more user characteristics that identify a user of the card;
  determine whether the PKI certificate read from the card is active via an online certificate status protocol (OCSP) server that is external to the multi-function peripheral device; in response to determining that the PKI certificate read from the card is active;
   locate a mapping of user characteristics to privileges, and
   determine, for the user of the card based upon the mapping of user characteristics to privileges, one or more functions on the multi-function peripheral device that the user is permitted to access,
  generate a replica of a document in response to the user selecting at least one function from the one or more functions on the multi-function peripheral device that the user is permitted to access; and
  add, to the replica of the document, in generating the replica of the document, one or more of: (a) a watermark that visually indicates in a human-readable form, the information read from the card that indicates one or more user characteristics that identify the user of the card, or (b) a barcode that encodes in a machine-readable form, the information read from the card that indicates one or more user characteristics that identify the user of the card; wherein the one or more user characteristics are not indicated in the document.

2. The multi-function peripheral device of claim 1, wherein, in generating the replica of the document, the multi-function peripheral device performs one or more of: prints the barcode onto the replica of the document, wherein the barcode indicates the one or more user characteristics that identify the user of the card in an encoded form or prints the watermark onto the replica of the document, wherein the watermark indicates the one or more user characteristics that identify the user of the card in a form that is readable by a human.

3. The multi-function peripheral device of claim 1, wherein the one or more user characteristics that identify a user of the card comprise a military rank of the user.

4. The multi-function peripheral device of claim 1, wherein the watermark indicates, prior to any duplication of the replica of the document, that the replica of the document is an unauthorized copy of the document.

5. The multi-function peripheral device of claim 1, wherein the multi-function peripheral device prints, onto the replica of the document, while generating the replica of the document, particular information that indicates one or more of: (a) a date on which the replica of the document was generated, (b) a time at which the replica of the document was generated, or (c) an identity of the multi-function peripheral device; and wherein the particular information is in a form of one or more of: (a) the watermark or (b) the barcode.

6. The multi-function peripheral device of claim 1, wherein the replica of the document is one or more of: (a) a physical photocopy of a physical copy of the document, (b) a physical printed copy of a digital version of the document, or (c) a digital image produced by scanning a physical copy of the document.

7. The multi-function peripheral device of claim 1, wherein the information that indicates one or more user characteristics that identify a user of the card indicates an identity of the user, wherein the identity of the user is contained in data that is stored on the card.

8. One or more non-transitory computer-readable storage media storing instructions which, when processed by one or more processors, cause:
 a multi-function peripheral device to read, from a card, a) a public key infrastructure (PKI) certificate, and b) information that indicates one or more user characteristics that identify a user of the card;
 the multi-function peripheral device to determine whether the PKI certificate read from the card is active via an online certificate status protocol (OCSP) server that is external to the multi-function peripheral device;
 the multi-function peripheral device, in response to determining that the PKI certificate read from the card is active:
  locate a mapping of user characteristics to privileges, and
  determine, for the user of the card based upon the mapping of user characteristics to privileges, one or more functions on the multi-function peripheral device that the user is permitted to access,
 the multi-function peripheral device to generate a replica of a document in response to the user selecting at least one function from the one or more functions on the multi-function peripheral that the user is permitted to access; and
 the multi-function peripheral device to add, to the replica of the document, in generating the replica of the document, one or more of: (a) a watermark that visually indicates in a human-readable form, the information read from the card that indicates one or more user characteristics that identify the user of the card, or (b) a barcode that encodes in a machine-readable form, the information read from the card that indicates one or more characteristics that identify the user of the card; wherein the one or more user characteristics are not indicated in the document.

9. The one or more non-transitory computer-readable storage media of claim 8, wherein, in generating the replica of the document, the multi-function peripheral device performs one or more of: prints the barcode onto the replica of the document, wherein the barcode indicates the one or more user characteristics that identify the user of the card in an encoded form or prints the watermark onto the replica of the document, wherein the watermark indicates the one or more user characteristics that identify the user of the card in a form that is readable by a human.

10. The one or more non-transitory computer-readable storage media of claim 8, wherein the one or more user characteristics that identify a user of the card comprise a military rank of the user.

11. The one or more non-transitory computer-readable storage media of claim 8, wherein the watermark indicates, prior to any duplication of the replica of the document, that the replica of the document is an unauthorized copy of the document.

12. The one or more non-transitory computer-readable storage media of claim 8, wherein in generating the replica of the document, the multi-function peripheral device prints, onto the replica of the document, particular information that indicates one or more of: (a) a date on which the replica of the document was generated, (b) a time at which the replica of the document was generated, or (c) an identity of the multi-function peripheral device; and wherein the particular information is in a form of one or more of: (a) the watermark or (b) the barcode.

13. The one or more non-transitory computer-readable storage media of claim 8, wherein the replica of the document is one or more of: (a) a physical photocopy of a physical copy of the document, (b) a physical printed copy of a digital version of the document, or (c) a digital image produced by scanning a physical copy of the document.

14. The one or more non-transitory computer-readable storage media of claim 8, wherein the information that indicates one or more user characteristics that identify a user of the card indicates an identity of the user, wherein the identity of the user is contained in data that is stored on the card.

15. A computer-implemented method comprising:
a multi-function peripheral device reading, from a card, information that indicates one or more user characteristics that identify a user of the card;
the multi-function peripheral device to determine whether the PKI certificate read from the card is active via an online certificate status protocol (OCSP) server that is external to the multi-function peripheral device;
the multi-function peripheral device, in response to determining that the PKI certificate read from the card is active:
locate a mapping of user characteristics to privileges, and
determine, for the user of the card based upon the mapping of user characteristics to privileges, one or more functions on the multi-function peripheral device that the user is permitted to access,
the multi-function peripheral device generating a replica of a document in response to the user selecting at least one function from the one or more functions on the multi-function peripheral that the user is permitted to access; and
the multi-function peripheral device adding, to the replica of the document, in generating the replica of the document, one or more of: (a) a watermark that visually indicates in a human-readable form, the information read from the card that indicates one or more user characteristics that identify the user of the card, or (b) a barcode that encodes in a machine-readable form, the information read from the card that indicates one or more user characteristics that identify the user of the card; wherein the one or more user characteristics are not indicated in the document.

16. The computer-implemented method of claim 15, wherein the watermark indicates, prior to any duplication of the replica of the document, that the replica of the document is an unauthorized copy of the document.

17. The computer-implemented method of claim 15, wherein the replica of the document is one or more of: (a) a physical photocopy of a physical copy of the document, (b) a physical printed copy of a digital version of the document, or (c) a digital image produced by scanning a physical copy of the document.

18. The computer-implemented method of claim 15, wherein the information that indicates one or more user characteristics that identify a user of the card indicates an identity of the user, wherein the identity of the user is contained in data that is stored on the card.

\* \* \* \* \*